United States Patent
Franko et al.

(10) Patent No.: US 12,504,806 B2
(45) Date of Patent: *Dec. 23, 2025

(54) MECHANISM FOR SAVING POWER ON A BUS INTERFACE

(71) Applicant: Apple Inc., Cupertino, CA (US)

(72) Inventors: Itay Franko, Toronto (CA); Derek Iwamoto, Sunnyvale, CA (US); Mark Ferdinand Damarillo, San Jose, CA (US); William O. Ferry, San Jose, CA (US); Yi-Chun Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/337,189

(22) Filed: Jun. 19, 2023

(65) Prior Publication Data

US 2024/0028103 A1    Jan. 25, 2024

Related U.S. Application Data

(63) Continuation of application No. 16/947,440, filed on Jul. 31, 2020, now Pat. No. 11,703,935.

(51) Int. Cl.
*G06F 1/3234* (2019.01)
*G06F 1/3209* (2019.01)
(Continued)

(52) U.S. Cl.
CPC .......... *G06F 1/3253* (2013.01); *G06F 1/3209* (2013.01); *G06F 1/3296* (2013.01);
(Continued)

(58) Field of Classification Search
CPC .... G06F 1/3253; G06F 1/3209; G06F 1/3296; G06F 11/3027; G06F 11/3062
(Continued)

(56) References Cited

U.S. PATENT DOCUMENTS 5,799,196 A * 8/1998 Flannery ............... G06F 1/3215
713/320
6,272,644 B1 * 8/2001 Urade .................... G06F 1/3203
713/320

(Continued)

OTHER PUBLICATIONS

Hewlett-Packard Company, "Universal Serial Bus 3.0 Specification", Nov. 12, 2008, Revision 1.0, pp. 1-482.

*Primary Examiner* — Paul R. Myers
(74) *Attorney, Agent, or Firm* — Robert C. Kowert; Kowert, Hood, Munyon, Rankin & Goetzel, P.C.

(57) ABSTRACT

Systems, apparatuses, and methods for saving power on a bus interface are described. A system includes a host, a device, and a repeater interposed between the host and the device. While the host and device are in a low-power state, the repeater monitors a first bus to determine if the device has woken up. When the repeater detects a remote wake-up event initiated by the device, the repeater generates an interrupt which is sent to the host. The host responds to the interrupt by initiating a resume wake-up event procedure that assumes the device is still asleep. In this way, the host is able to stay in the low-power state longer while also using a wake-up procedure that does not require the host to be aware of the existence of the repeater.

20 Claims, 7 Drawing Sheets

(51) Int. Cl.
*G06F 1/3296* (2019.01)
*G06F 11/30* (2006.01)
*H04B 3/36* (2006.01)

(52) U.S. Cl.
CPC ...... *G06F 11/3027* (2013.01); *G06F 11/3062* (2013.01); *H04B 3/36* (2013.01)

(58) Field of Classification Search
USPC ........................................................ 713/320
See application file for complete search history.

(56) References Cited

U.S. PATENT DOCUMENTS

| | | | | |
|---|---|---|---|---|
| 6,772,241 | B1* | 8/2004 | George | G06F 13/24 710/36 |
| 7,197,578 | B1* | 3/2007 | Jacobs | G06F 1/3253 710/305 |
| 7,346,728 | B1* | 3/2008 | Jackson | G06F 13/4045 710/62 |
| 8,645,724 | B2* | 2/2014 | Jaramillo | H04L 25/0298 326/38 |
| 10,084,698 | B2* | 9/2018 | Srivastava | H04L 12/10 |
| 10,339,093 | B2 | 7/2019 | Srivastava | |
| 11,703,935 | B2* | 7/2023 | Franko | G06F 1/3209 713/320 |
| 2003/0204652 | A1* | 10/2003 | Saito | G06F 13/4081 710/33 |
| 2005/0034004 | A1* | 2/2005 | Bunker | G06F 13/387 713/400 |
| 2005/0198407 | A1* | 9/2005 | Lee | G06F 1/266 710/15 |
| 2006/0020736 | A1* | 1/2006 | Jackson | G06F 13/385 710/313 |
| 2006/0065743 | A1* | 3/2006 | Fruhauf | G06F 13/385 235/492 |
| 2008/0005445 | A1* | 1/2008 | Diefenbaugh | G06F 13/385 710/313 |
| 2008/0178011 | A1* | 7/2008 | Hubo | G06F 13/4282 713/300 |
| 2008/0307140 | A1* | 12/2008 | Goldstein | G06F 13/24 710/260 |
| 2008/0320202 | A1* | 12/2008 | Monks | G06F 13/426 710/313 |
| 2009/0210734 | A1* | 8/2009 | Schramm | G06F 13/385 713/324 |
| 2012/0023344 | A1* | 1/2012 | Miyanaga | H03K 5/082 710/316 |
| 2013/0169053 | A1* | 7/2013 | Lin | G06F 13/4081 307/80 |
| 2013/0304961 | A1* | 11/2013 | Lin | G06F 13/409 710/313 |
| 2014/0365690 | A1* | 12/2014 | Paramasivam | G06F 11/2247 710/8 |
| 2015/0253842 | A1* | 9/2015 | Murata | G06F 1/3287 713/323 |
| 2016/0043891 | A1* | 2/2016 | Hagihara | H04Q 9/00 370/311 |
| 2016/0162427 | A1* | 6/2016 | Kang | G06F 13/387 710/313 |
| 2017/0286360 | A1* | 10/2017 | Srivastava | G06F 13/4295 |
| 2018/0173666 | A1* | 6/2018 | Srivastava | G06F 13/4027 |
| 2018/0189222 | A1* | 7/2018 | Srivastava | G06F 13/287 |
| 2018/0335830 | A1* | 11/2018 | Srivastava | G06F 1/325 |

* cited by examiner

MECHANISM FOR SAVING POWER ON A BUS INTERFACE

PRIORITY INFORMATION

This application claims priority to U.S. patent application Ser. No. 16/947,440, entitled "Mechanism for Saving Power on a Bus Interface," filed Jul. 31, 2020, which is hereby incorporated by reference in its entirety as though fully and completely set forth herein.

BACKGROUND

Technical Field

Embodiments described herein relate to the field of computing systems and, more particularly, to saving power on a bus interface between a host and a device.

Description of the Related Art

Transistor dimensions continue to decrease enabling more transistors to be packed into a single integrated circuit (IC) or system on chip (SOC). This allows a SOC to contain more functionality, and the functional units in an SOC are often connected to other devices via different types of interfaces. One example of an industry standard interface for providing connections between components is the universal serial bus (USB) interface. Some modern SOCs with external connections use a USB type-C connector. This connector can use different types of protocols, such as the USB3.x protocol with the SOC acting as a host. If a USB host and a USB device do not communicate during some threshold amount of time, the USB host can suspend the USB interface and enter a low-power mode so as to conserve power. According to the USB3.x protocol, during low power mode, the USB3.x host is required to check every 100 milliseconds (ms) to determine if the device is still connected. However, if the host is checking for activity by the device every 100 ms, this requires the host to keep its physical interface (PHY) unit powered on, increasing the power consumed by the host during low-power mode.

SUMMARY

Systems, apparatuses, and methods for saving power on a bus interface are contemplated. In one embodiment, a system includes a device, a repeater connected to the device via a first bus, and a host connected to the repeater via a second bus. Traditionally, the host and the device would be connected directly to each other, but the repeater is placed in between the host and the device to create a more efficient and versatile interface. The host and device go into a low-power state during periods of low activity in order to reduce power consumption. When the host and device are in the low-power state, the repeater monitors the first bus to determine if the device has woken up. When the repeater detects a remote wake-up event initiated by the device, the repeater generates an interrupt which is sent to the host. The host responds to the interrupt by initiating a procedure as if the host itself is initiating a resume wake-up event. In this way, the host is able to reduce power consumption during the low-power state. Also, this scheme does not require the host to modify its wake-up procedure to account for the presence of the repeater in between the host and the device.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
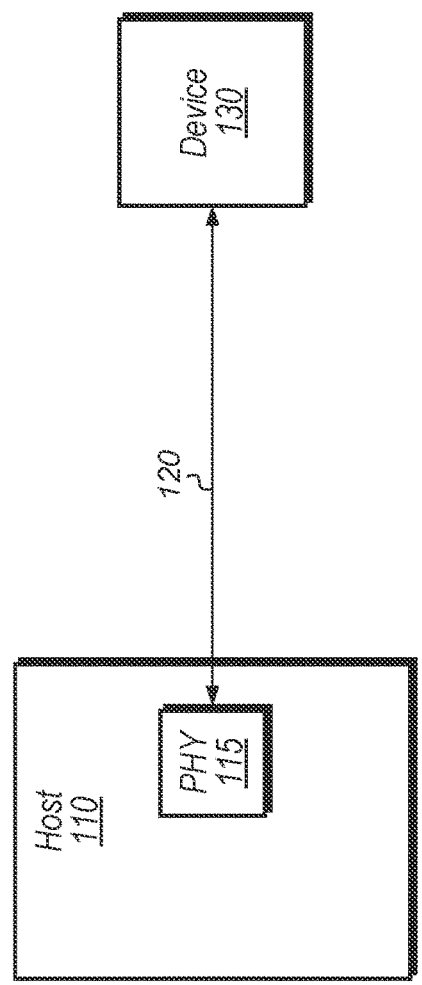
FIG. 1 is a generalized block diagram of one embodiment of a prior art computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a block diagram of one embodiment of a prior art computing system 100 is shown. As shown in FIG. 1, system includes a host 110, an interface 120, and a device 130. In one embodiment, interface 120 is a universal serial bus (USB) interface. In other embodiments, interface 120 is any of various other types of interfaces. When the host 110 and device 130 are not communicating over interface 120, the communication elements and/or processing elements of host 110 and device 130 can go into a low-power state to conserve power. However, even when host 110 enters a low-power state, physical interface unit (PHY) 115 is required to stay on to monitor interface 120 for any electrical activity by device 130. This causes PHY unit 115 to remain on and consume power. Unfortunately, this results in a constant drain of power during the low-power state.

It is noted that a "low-power state" as defined herein can be a state in which a voltage supplied to one or more components is reduced from its maximum, a state in which the frequency of the clock signal is reduced from its maximum, a state in which the clock signal is inhibited from the component(s) (clock-gated), one in which power is removed from the component(s) (power-gated), or a combination of any of the former. It is noted that the terms "low-power state", "reduced power state", and "sleep state" may be used interchangeably herein.

Figure 2:
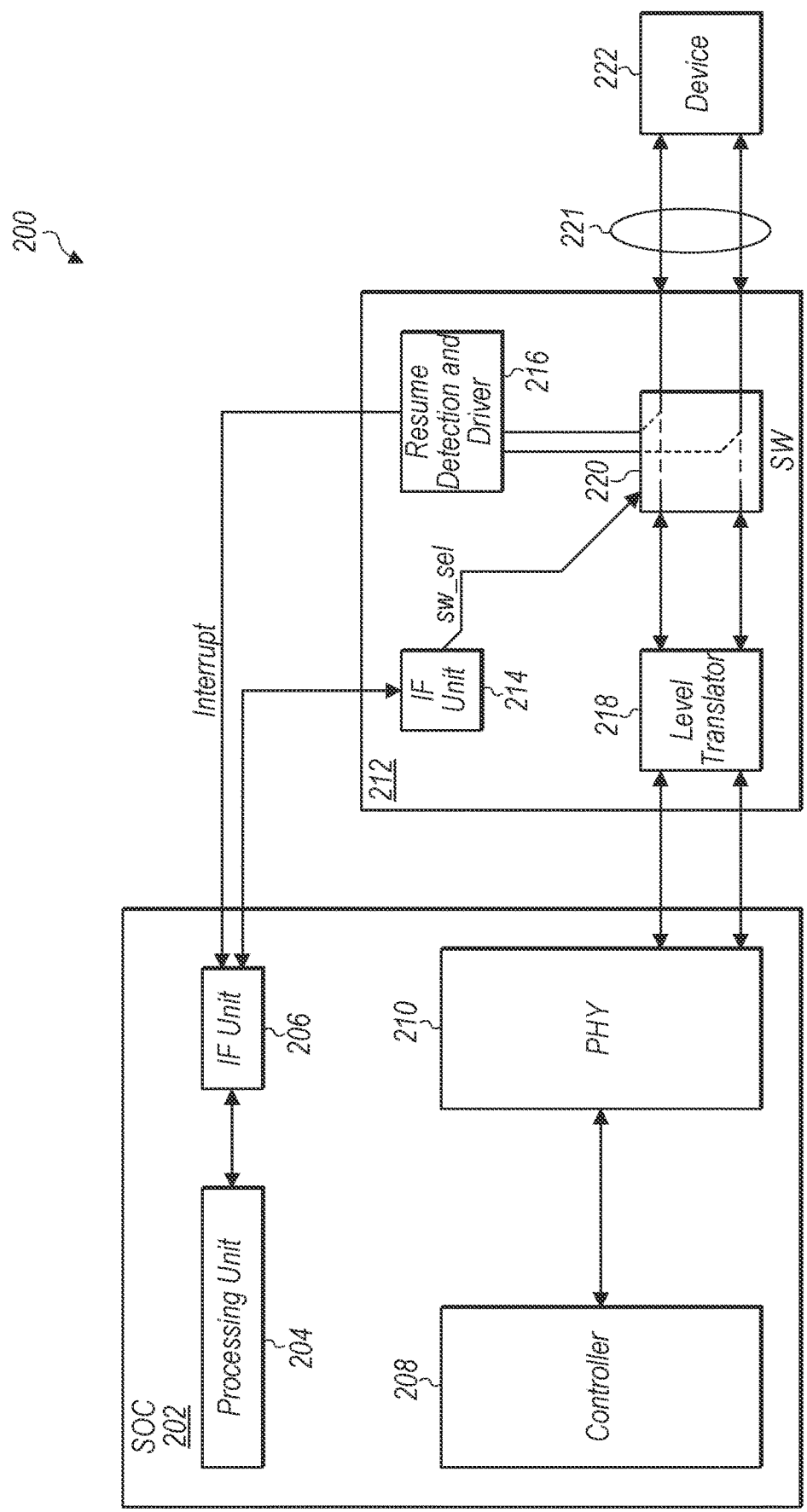
FIG. 2 is a generalized block diagram illustrating one embodiment an apparatus for reducing power consumption during a low-power state.

Turning now to FIG. 2, a block diagram of one embodiment of an apparatus 200 for reducing power consumption during a low-power state is shown. As shown in FIG. 2, apparatus 200 includes system on chip (SOC) 202 coupled to repeater 212, with repeater 212 coupled to device 222. In one embodiment, device 222 is a USB device, and the signals transmitted between repeater 212 and device 222 are compliant with the USB protocol. In other embodiments, device 222 may be connected to repeater 212 using other types of interfaces, and the signals transmitted between repeater 212 and device 222 may be compliant with other types of protocols. In one embodiment, neither SOC 202 nor device 222 are aware that repeater 212 is interposed between them. In other words, in this embodiment, from the point of view of SOC 202 and device 222, a direct connection exists between device 222 and SOC 202.

In one embodiment, SOC 202 includes processing unit 204, interface unit 206, controller 208, and PHY unit 210. It is noted that SOC 202 may also include (or be connected to) any number of other components (e.g., cache, memory device) which are not shown to avoid obscuring the figure. In one embodiment, processing unit 204 executes software instructions of an operating system and/or one or more applications. Processing unit 204 is representative of any number and type of processing units and/or control logic. In one embodiment, processing unit 204 includes an interrupt handler for processing interrupts generated by repeater 212. Interface unit (or IF unit) 206 provides the interface between processing unit 204 and repeater 212. In one embodiment, interface unit 206 communicates according to the inter-integrated circuit (I2C) protocol. In other embodiments, interface unit 206 is compliant with any of various other protocols.

In scenarios where SOC 202 or portions thereof are relatively inactive, various components of SOC 202 may enter a reduced power state so as to reduce power consumption. For example, if device 222 becomes inactive or stops communicating to SOC 202, the various components such as controller 208 and PHY unit 210 may enter a low-power state to reduce power consumption of SOC 202. PHY unit 210 is able to enter the low-power state since repeater 212 can monitor the interface to device 222 to periodically check if device 222 has woken up. In one embodiment, if device 222 wakes up while PHY unit 210 is in the low-power state, resume detection and driver 216 will detect electrical activity on the interface connection to device 222. In response to detecting the electrical activity when PHY unit 210 is in the low-power state, resume detection and driver 216 generates an interrupt, and the interrupt is conveyed to processing unit 204 via interface unit 206.

For embodiments where interface 221 is in a sleep state and interface 221 is a USB interface, if device 222 is the first component to wake up, this is referred to as remote wake-up event. In these embodiments, when SOC 202 (acting as a host) is the first component to wake up from the low-power state, this is referred to as a resume wake-up event. In one embodiment, in order to streamline the wake-up procedure from an interface 221 sleep state, SOC 202 implements a resume wake-up event procedure in response to repeater 212 detecting a remote wake-up event initiated by device 222. In other words, a remote wake-up event is converted into a resume wake-up event. This conversion helps to simplify the response to the wake-up event for scenarios where SOC 202 is unaware of the presence of repeater 212. By converting the remote wake-up event into a resume wake-up event, the procedure for SOC 202 to exit the low-power state is less complex and more power efficient than if SOC 202 were to respond to a remote wake-up event.

In one embodiment, repeater 212 includes interface unit 214, resume detection and driver 216, level translator 218, and switch 220. In other embodiments, repeater 212 may include other components arranged in other suitable manners. In one embodiment, level translator 218 translates signals received from PHY unit 210 from a first voltage to a second voltage when conveying the signals to device 222 via switch 220. In one embodiment, the second voltage is at a higher voltage level than the first voltage. For signals received from device 222, level translator 218 translates the signals from the second voltage to the first voltage. Switch 220 allows signals to pass from device 222 to level translator 218 when interface 221 and device 222 are active. When interface 221 goes into a sleep state, a software select signal (or sw_sel) from interface unit 214 causes switch 220 to route the signals to resume detection and driver 216, allowing resume detection and driver 216 to monitor the interface 221 for electrical signals generated by device 222.

Figure 3:
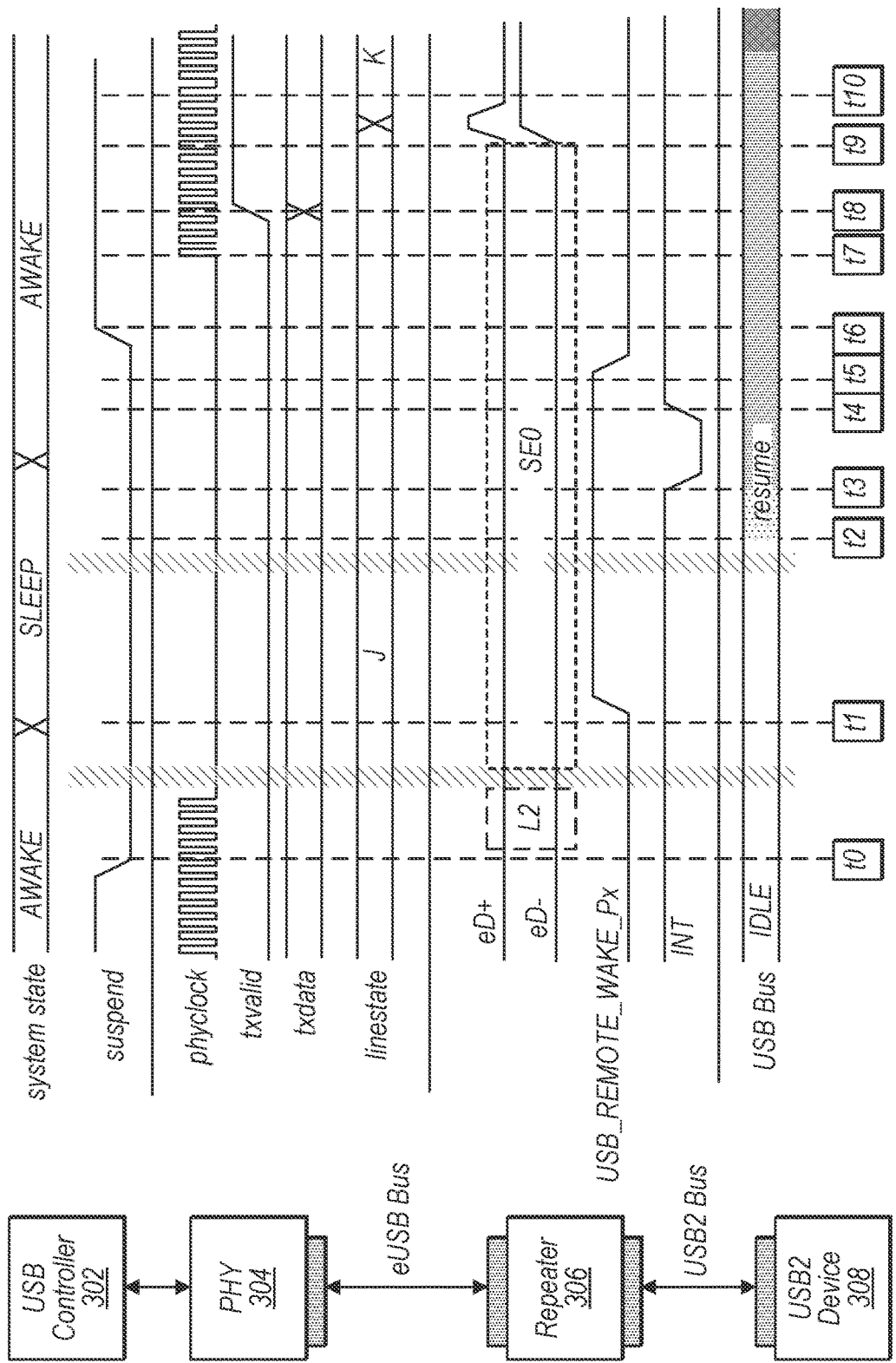
FIG. 3 is a timing diagram of one embodiment of a sequence of events for a USB device waking up from a low-power state.

Referring now to FIG. 3, a timing diagram 300 of one embodiment of a sequence of events for a USB device waking up from a low-power state is shown. On the left-side of FIG. 3, the components that are included in a given computing system in accordance with one embodiment are shown. For example, in one embodiment, the system includes at least USB controller 302, PHY unit 304, repeater 306, and USB2 device 308. The waveforms are shown to the right of the components for the signals generated or received by these components. It should be understood that the example of device 308 being a USB2 device is merely indicative of one particular embodiment. In other embodiments, the system components may utilize other types of protocols and/or interfaces.

The sequence of events for implementing a sleep state and performing wake-up detection are the following: At time t0, the USB port of repeater 306 enters the low-power (or L2) state. In one embodiment, PHY unit 304 sends out a command to repeater 306 to put the USB port into the low-power state when a suspend signal is asserted. At time t1, the software executing on the SOC (e.g., SOC 202 of FIG. 2) enables an interrupt for a USB remote wakeup event generated by repeater 306. Next, at time t2, the USB2 device 308 sends out a remote wakeup signal.

At time t3, repeater 306 asserts the interrupt to the SOC in response to detecting the remote wakeup signal, and repeater 306 reflects a resume state on the USB2 bus. At time t4, software executing on the SOC clears the interrupt. Then, at time t5, software executing on the SOC disables the interrupt for the USB remote wakeup event. Next, at time t6, software executing on the SOC initiates a resume event, and the suspend signal is de-asserted. Then, at time t7, PHY unit 304 starts to generate the PHY clock. At time t8, the repeater 306 starts to drive a resume signal on the bus to USB controller 302. In one embodiment, a resume signal is a change of the bus state from a J state to a K state for at least 20 ms. As defined by the USB protocol, a J state is a differential 1 for a full-speed bus and a K state is a differential 0 for the full-speed bus. A differential 1 is when the D+ line is a logic high and the D− line is a logic low. A differential 0 exists when the D+ line is a logic low and the D− line is a logic high. In other embodiments, other types of resume signals may be utilized.

At time t9, PHY unit 304 drives a resume signal on the embedded USB (eUSB) bus to repeater 306. Previously, before time t9, the eUSB bus is in the Single-Ended-Zero (SE0) state, with the SE0 state defined as the D+ and D− lines being at a logic low level. At time t10, repeater 306 drives a resume signal on the USB bus to USB2 device 308. It is noted that the events t0-t10 shown in timing diagram 300 are merely indicative of one particular embodiment. In other embodiments, the order of events may vary and/or other events may occur as part of the wake-up process.

Figure 4:
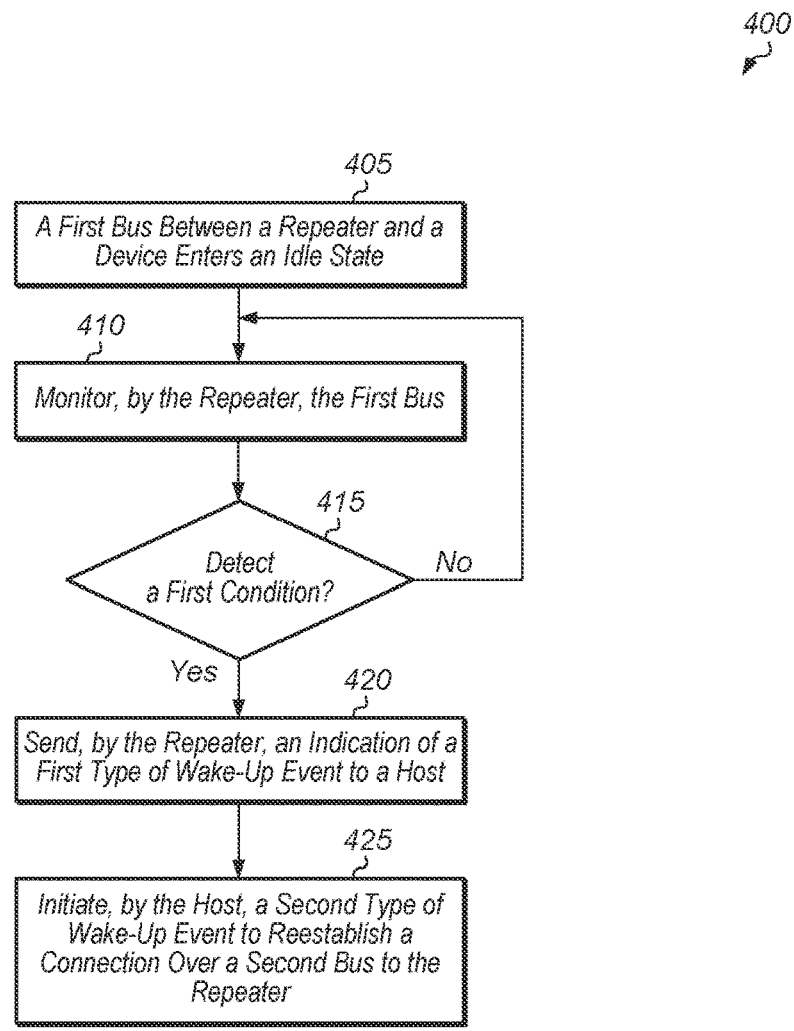
FIG. 4 is a flow diagram of one embodiment of a method for managing a bus idle state.

Turning now to FIG. 4, a generalized flow diagram of one embodiment of a method 400 for managing a bus idle state is shown. For purposes of discussion, the steps in this embodiment (as well as for FIGS. 5-6) are shown in sequential order. However, in other embodiments some steps may occur in a different order than shown, some steps may be performed concurrently, some steps may be combined with other steps, and some steps may be absent.

A first bus between a repeater and a host enters an idle state (block 405). In one embodiment, the first bus enters the idle state when no data has been sent over the first bus for a threshold amount of time. The duration of the threshold amount of time may vary according to the embodiment. Next, the repeater monitors the first bus during the idle state (block 410). If the repeater detects a first condition on the first bus while the first bus is in an idle state (conditional block 415, "yes" leg), then the repeater sends an indication of a first type of wake-up event to the host (block 420). Otherwise, if the repeater does not detect the first condition (conditional block 415, "no" leg), then method 400 returns to block 410. In one embodiment, the first condition electrical activity (i.e., a voltage transition) generated by the device on the first bus. In one embodiment, the repeater triggers an interrupt on the host, with the interrupt being associated with the first type of wake-up event. In one embodiment, the first type of wake-up event is the device attempting to reestablish a connection to the host. In other embodiments, the first condition may be other types of conditions (e.g., detecting a sideband signal), the first type of wake-up event may be other types of wake-up events (e.g., a restart), and/or the repeater may send other types of indications of the first type of wake-up event to the host.

After block 420, the host initiates a second type of wake-up event to reestablish a connection over a second bus to the repeater in response to receiving the indication of the first type of wake-up event (block 425). After block 425, method 400 ends. In one embodiment, the second type of wake-up event is the host attempting to reestablish a connection to the device. In other embodiments, the second type of wake-up event may be other types of wake-up events. Additionally, it is noted that in one embodiment, signals on the first bus are transmitted at a first voltage level, wherein signals on the second bus are transmitted at a second voltage level. In some embodiments, the first voltage level is greater than the second voltage level.

Figure 5:
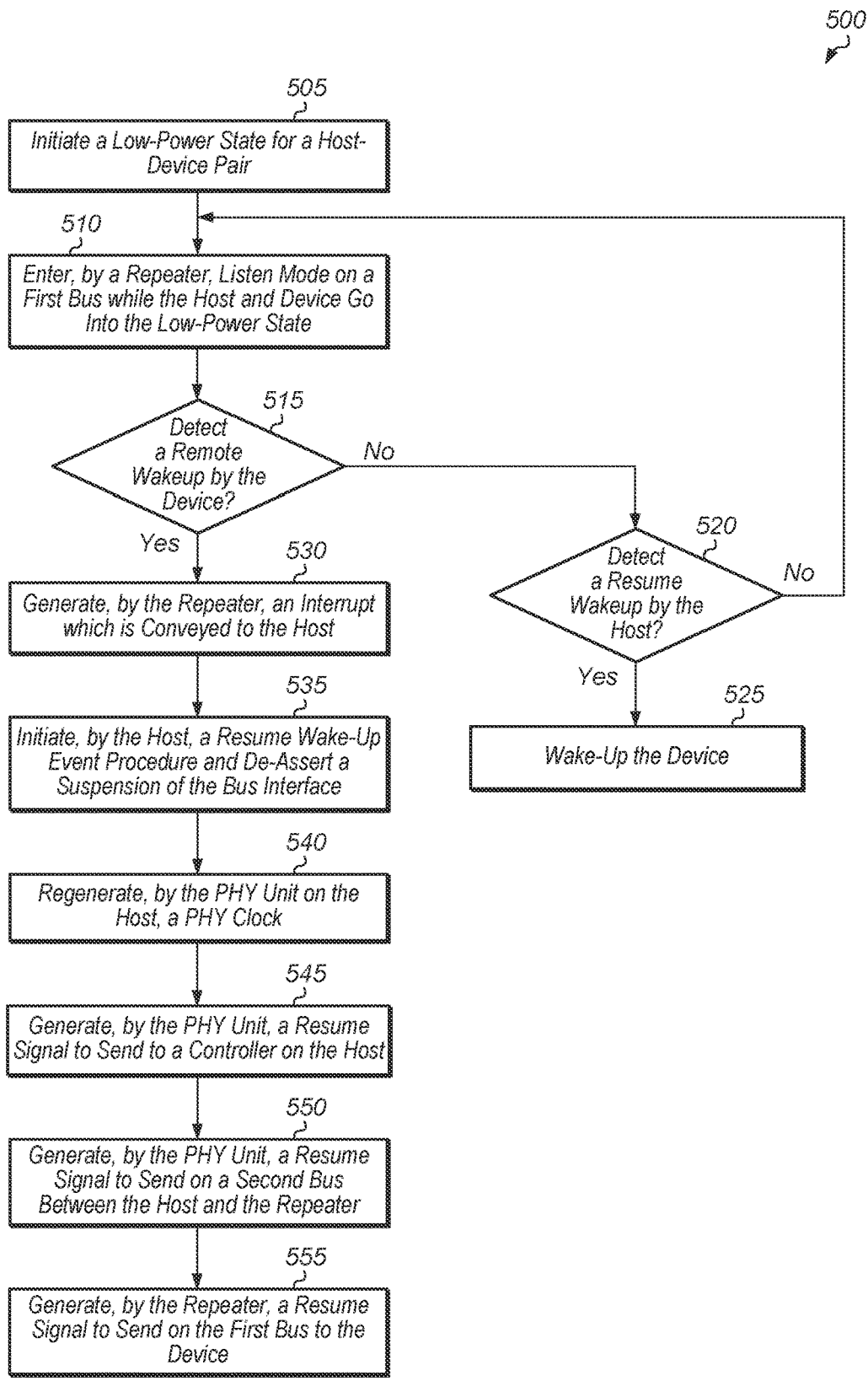
FIG. 5 is a flow diagram of one embodiment of a method for managing a low-power state for a host-device pair.

Referring now to FIG. 5, a generalized flow diagram of one embodiment of a method 500 for managing a low-power state for a host-device pair is shown. A low-power state is initiated for a host-device pair (block 505). In one embodiment, initiating the low-power state involves sending a low-power state initiation command to a repeater and enabling an interrupt at the host. Next, a repeater enters listen mode on a first bus while the host and device go into the low-power state (block 510). If the repeater does not detect a remote wakeup by the device (conditional block 515, "no" leg), but the repeater detects a resume wakeup by the host (conditional block 520, "yes" leg), then the repeater wakes up the device (block 525). Otherwise, if the repeater does not detect a resume wakeup by the host (conditional block 520, "no" leg), then method 500 returns to block 510.

If the repeater detects a remote wakeup by the device (conditional block 515, "yes" leg), then the repeater generates an interrupt which is conveyed to the host (block 530). In one embodiment, the interrupt is conveyed from the repeater to the host on a sideband path that is separate from the first bus. In response to receiving the interrupt, the host initiates a resume wake-up event procedure and de-asserts a suspension of the interface (block 535). Also, a PHY unit on the host regenerates a PHY clock (block 540). Additionally, the PHY unit generates a resume signal to send to the controller on the host (block 545). Next, the PHY unit generates a resume signal to send on a second bus between the host and the repeater (block 550). Then, the repeater generates a resume signal to send on the first bus to the device (block 555). After block 555, method 500 ends.

Figure 6:
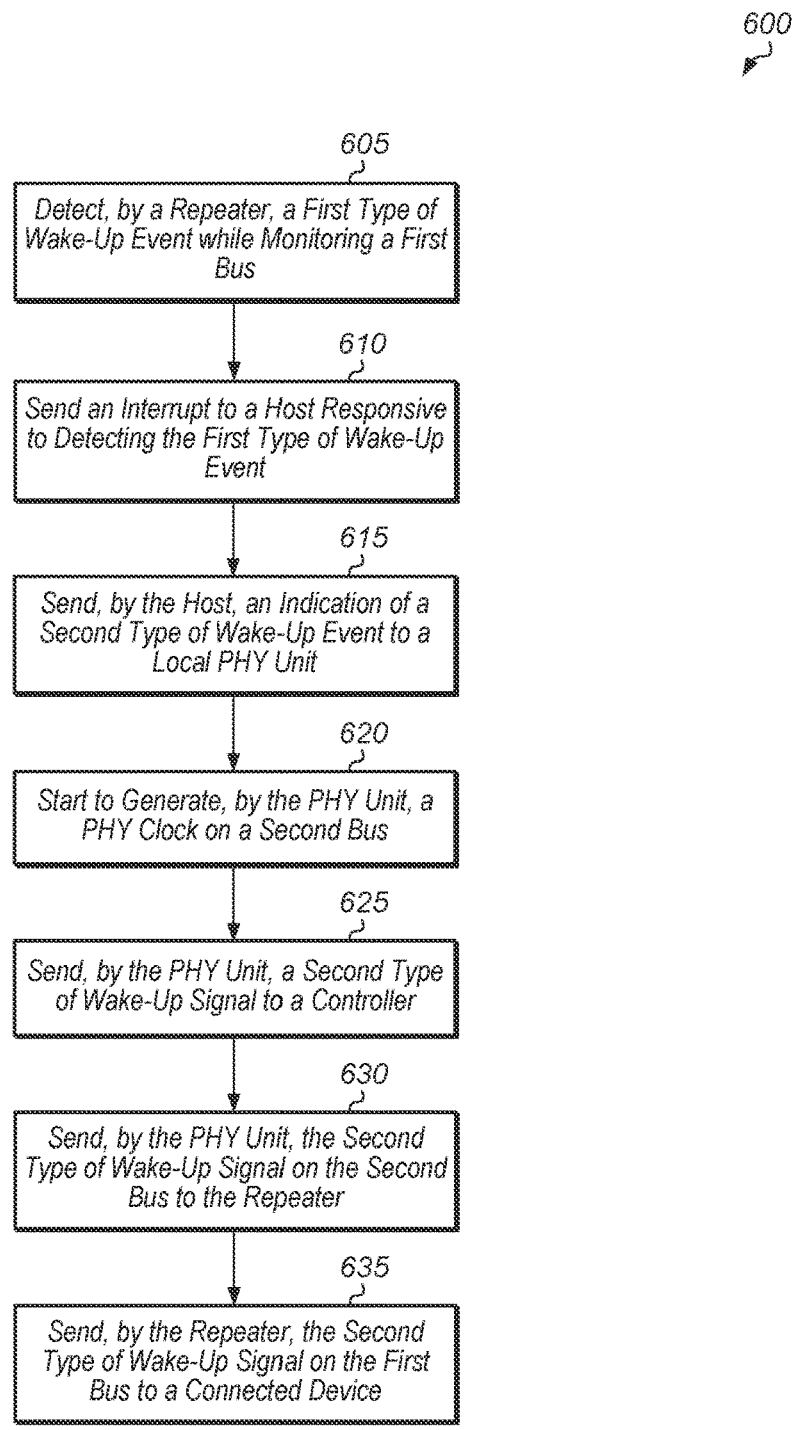
FIG. 6 is a flow diagram of one embodiment of a method for converting a first type of wake-up event into a second type of wake-up event.

Turning now to FIG. 6, one embodiment of a method 600 for converting a first type of wake-up event into a second type of wake-up event is shown. A repeater detects a first type of wake-up event while monitoring a first bus (block 605). In one embodiment, the first type of wake-up event is a remote wake-up event initiated by a device on the first bus. As used herein, the term "remote wake-up event" is defined as an event triggered by a device during a low-power or suspend state when the device wakes up prior to a host. Next, the repeater sends an interrupt to a host responsive to detecting the first type of wake-up event (block 610). Then, the host sends an indication of a second type of wake-up event to a local PHY unit (block 615). In one embodiment, the second type of wake-up event is a resume wake-up event. As used herein, the term "resume wake-up event" is defined as an event during a low-power or suspend state when the host wakes up and assumes that the device is still asleep.

In response to receiving the indication of the second type of wake-up event, the PHY unit starts to generate a PHY clock on a second bus (block 620). Also, in response to receiving the indication of the second type of wake-up event, the PHY unit sends a second type of wake-up signal to a controller (block 625). In one embodiment, the second type of wake-up signal is a resume signal. In this embodiment, the first type of wake-up signal is a remote signal. For example, in one embodiment, the remote signal is putting the first bus in the K state for greater than 1 ms but less than 15 ms. In another embodiment, the remote signal is an interrupt signal. In other embodiments, other types of wake-up signals may be utilized. Still further, in response to receiving the indication of the second type of wake-up event, the PHY unit sends the second type of wake-up signal on the second bus to the repeater (block 630). In response to receiving the resume signal, the repeater sends the second type of wake-up signal on the first bus to a connected device (block 635). After block 635, method 600 ends.

Figure 7:
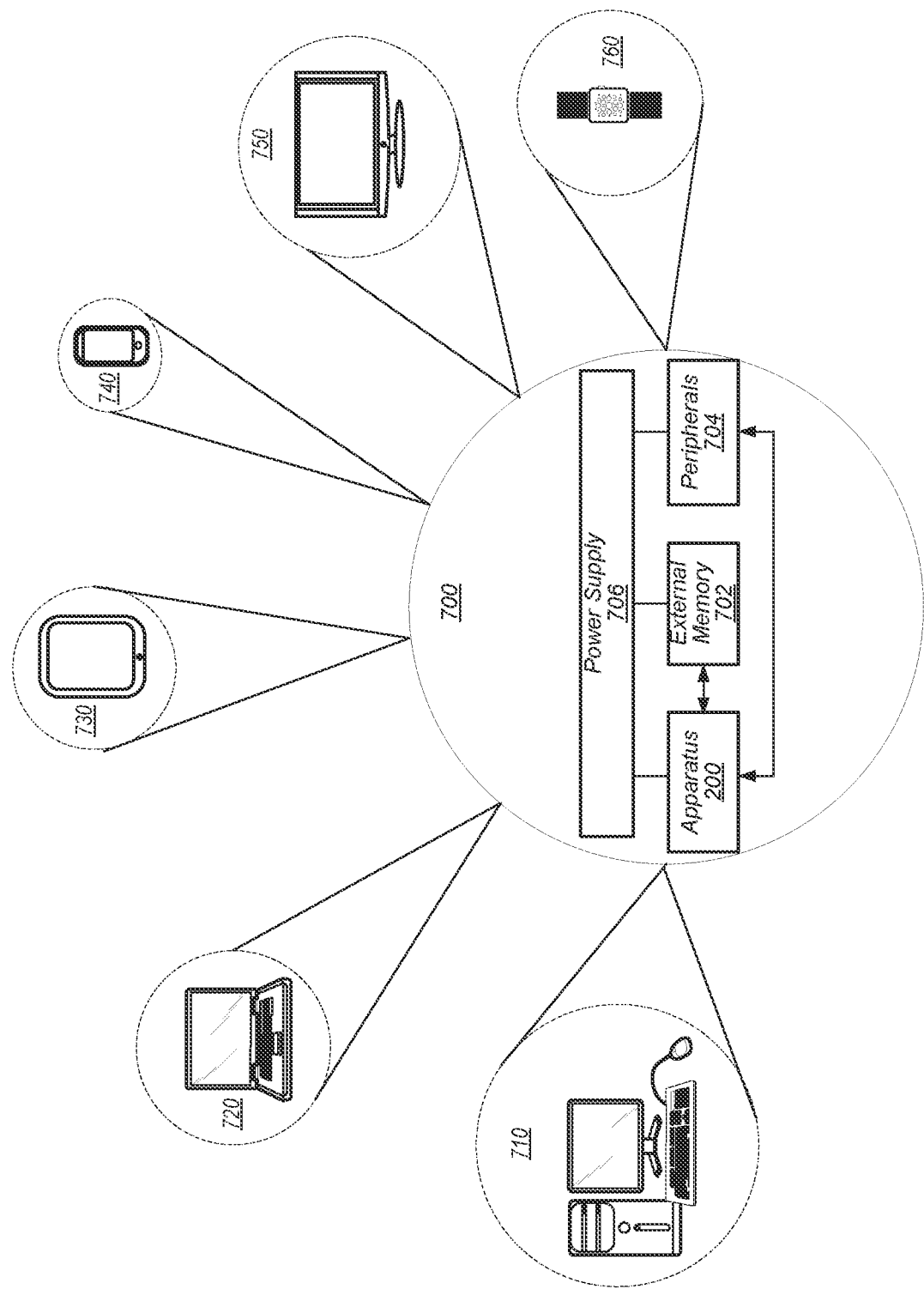
FIG. 7 is a block diagram of one embodiment of a system.

Referring now to FIG. 7, a block diagram of one embodiment of a system 700 is shown. As shown, system 700 may represent chip, circuitry, components, etc., of a desktop computer 710, laptop computer 720, tablet computer 730, cell or mobile phone 740, television 750 (or set top box configured to be coupled to a television), wrist watch or other wearable item 760, or otherwise. Other devices are possible and are contemplated. In the illustrated embodiment, the system 700 includes at least a portion of apparatus 200 (of FIG. 2) coupled to one or more peripherals 704 and the external memory 702. A power supply 706 is also provided which supplies the supply voltages to apparatus 200 as well as one or more supply voltages to the memory 702 and/or the peripherals 704. In various embodiments, power supply 706 may represent a battery (e.g., a rechargeable battery in a smart phone, laptop or tablet computer). In some embodiments, more than one instance of apparatus 200 may be included (and more than one external memory 702 may be included as well).

The memory 702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with apparatus 200 in a chip-on-chip configuration, a package-on-package configuration, or a multi-chip module configuration.

The peripherals 704 may include any desired circuitry, depending on the type of system 700. For example, in one embodiment, peripherals 704 may include devices for various types of wireless communication, such as wifi, Bluetooth, cellular, global positioning system, etc. The peripherals 704 may also include additional storage, including RAM storage, solid state storage, or disk storage. The peripherals 704 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus, comprising:
a repeater interposed between a host and a device connected via a bus, wherein the host and the device respectively implement a communications protocol over the bus, wherein the bus comprises a first portion connecting the host to the repeater and a second portion connecting the repeater and the device, and wherein the repeater is configured to:
detect a first type of wake-up event on the bus signaled via the communications protocol from the device over the second portion of the bus, while for the first portion of the bus is in a low-power state; and
convert the first type of wake-up event to a second type to signal the wake-up event to the host using a sideband path separate from the bus.

2. The apparatus as recited in claim 1, wherein at least the first portion of the bus is in compliance with a universal serial bus (USB), and wherein the communications protocol is in compliance with a USB protocol.

3. The apparatus as recited in claim 1, wherein the host is located on a first integrated circuit (IC), and wherein the repeater is located on a second IC.

4. The apparatus as recited in claim 1, wherein to signal the wake-up event the repeater is further configured to trigger an interrupt on the host using the sideband path.

5. The apparatus as recited in claim 1, wherein the wake-up event on the bus is a voltage transition generated by the device.

6. The apparatus as recited in claim 1, wherein the host connects to the bus via a host interface, and wherein the low-power state of the first portion of the bus comprises the host interface being placed in one of a power-gated state and a clock-gated state.

7. The apparatus as recited in claim 6, wherein the first portion of the bus conveys signals at a first voltage level, wherein the second portion of the bus conveys signals at a second voltage level, and wherein the first voltage level is less than the second voltage level.

8. A method utilizing a repeater interposed on a bus between a host and a device, the method comprising performing by the repeater:
detecting a first type of wake-up event on the bus signaled via the communications protocol from the device, while the communications protocol is disabled at the host, wherein the host and the device respectively implement the communications protocol over the bus, and wherein the repeater implements at least a portion of the communications protocol with the device; and
converting the first type of wake-up event to a second type to signal the host using a sideband path separate from the bus.

9. The method as recited in claim 8, wherein the bus is in compliance with a universal serial bus (USB), and wherein the communications protocol is in compliance with a USB protocol.

10. The method as recited in claim 8, wherein the host is located on a first integrated circuit (IC), and wherein the repeater is located on a second IC.

11. The method as recited in claim 8, wherein the repeater is further configured to signal the wake-up event by triggering an interrupt on the host.

12. The method as recited in claim 8, wherein the wake-up event on the bus is a voltage transition generated by the device.

13. The method as recited in claim 8, wherein the host connects to the bus via a host interface, wherein the communications protocol is disabled at the host due to the host interface being in one of a power-gated state and a clock-gated state.

14. The method as recited in claim 13, wherein the repeater is configured to convey signals to the device at a first voltage level, wherein the repeater is configured to convey signals to the host interface at a second voltage level, and wherein the first voltage level is greater than the second voltage level.

15. A system comprising:
a host connected to a first bus and configured to implement a communications protocol over the first bus, wherein the host comprises a sideband signal different from the first bus;
a device connected to a second bus and configured to implement the communications protocol over the second bus; and
a repeater connected to the first bus and the second bus, the repeater configured to:
 implement at least a portion of the communications protocol with the device;
 detect a first type of wake-up event on the second bus signaled via the communications protocol while the first bus is in a sleep state, and
 responsive to the wake-up event:
  convert the first type of wake-up event to a second type to signal the host using the sideband signal.

16. The system as recited in claim 15, wherein the first bus and the second bus are in compliance with a universal serial bus (USB), and wherein the communications protocol is in compliance with a USB protocol.

17. The system as recited in claim 15, wherein the host is located on a first integrated circuit (IC), and wherein the repeater is located on a second IC.

18. The system as recited in claim 15, wherein to signal the wake-up event the repeater is further configured to trigger an interrupt on the host via the sideband signal.

19. The system as recited in claim 15, wherein the host is connected to the first bus via a host interface, and wherein the sleep state of the first bus comprises the host interface being in one of a power-gated state and a clock-gated state.

20. The system as recited in claim 15, wherein the first bus comprises a first voltage level, wherein the second bus comprises a second voltage level, and wherein the first voltage level is less than the second voltage level.

\* \* \* \* \*